United States Patent
Gostylla et al.

(10) Patent No.: US 6,592,015 B1
(45) Date of Patent: Jul. 15, 2003

(54) FEEDING HEADS FOR FASTENING MACHINES

(75) Inventors: Wojciech Gostylla, Camira (AU); Stuart Edmund Blacket, Closeburn (AU)

(73) Assignee: Henrob Limited (GB)

( * ) Notice: Subject to any disclaimer, the term of this patent is extended or adjusted under 35 U.S.C. 154(b) by 0 days.

(21) Appl. No.: 09/202,373

(22) PCT Filed: Jun. 16, 1997

(86) PCT No.: PCT/AU97/00376
§ 371 (c)(1),
(2), (4) Date: Apr. 11, 2000

(87) PCT Pub. No.: WO97/48510
PCT Pub. Date: Dec. 24, 1997

(30) Foreign Application Priority Data

Jun. 14, 1996 (AU) ............................................. PO 0452

(51) Int. Cl.$^7$ .................................................. B25C 1/04
(52) U.S. Cl. ........................ 227/112; 227/107; 227/113; 227/119

(58) Field of Search .................................. 227/107, 112, 227/113, 136, 119

(56) References Cited

U.S. PATENT DOCUMENTS 5,156,314 A * 10/1992 Wallace ....................... 221/239
5,779,127 A * 7/1998 Blacket et al. .............. 227/107
5,964,393 A * 10/1999 Feldpausch et al. ......... 227/135

FOREIGN PATENT DOCUMENTS

AU 29357/92 6/1993
WO WO 95/28242 * 10/1995 ............ B21J/15/30

* cited by examiner

Primary Examiner—Rinaldi I. Rada
Assistant Examiner—Gloria R. Weeks
(74) Attorney, Agent, or Firm—Piper Rudnick

(57) ABSTRACT

A fastener feeding head (10) has fasteners (21, 121, 221) supplied to a fastener passage (15, 115, 215) aligned with a fastener engagement means (14, 114, 214) driven down the fastener passage by a drive means (13) to engage the fastener with workpieces (31, 131, 231). A charge of compressed gas is used to hold the fastener (21, 121, 221) against its engagement means (14, 114, 214).

14 Claims, 5 Drawing Sheets

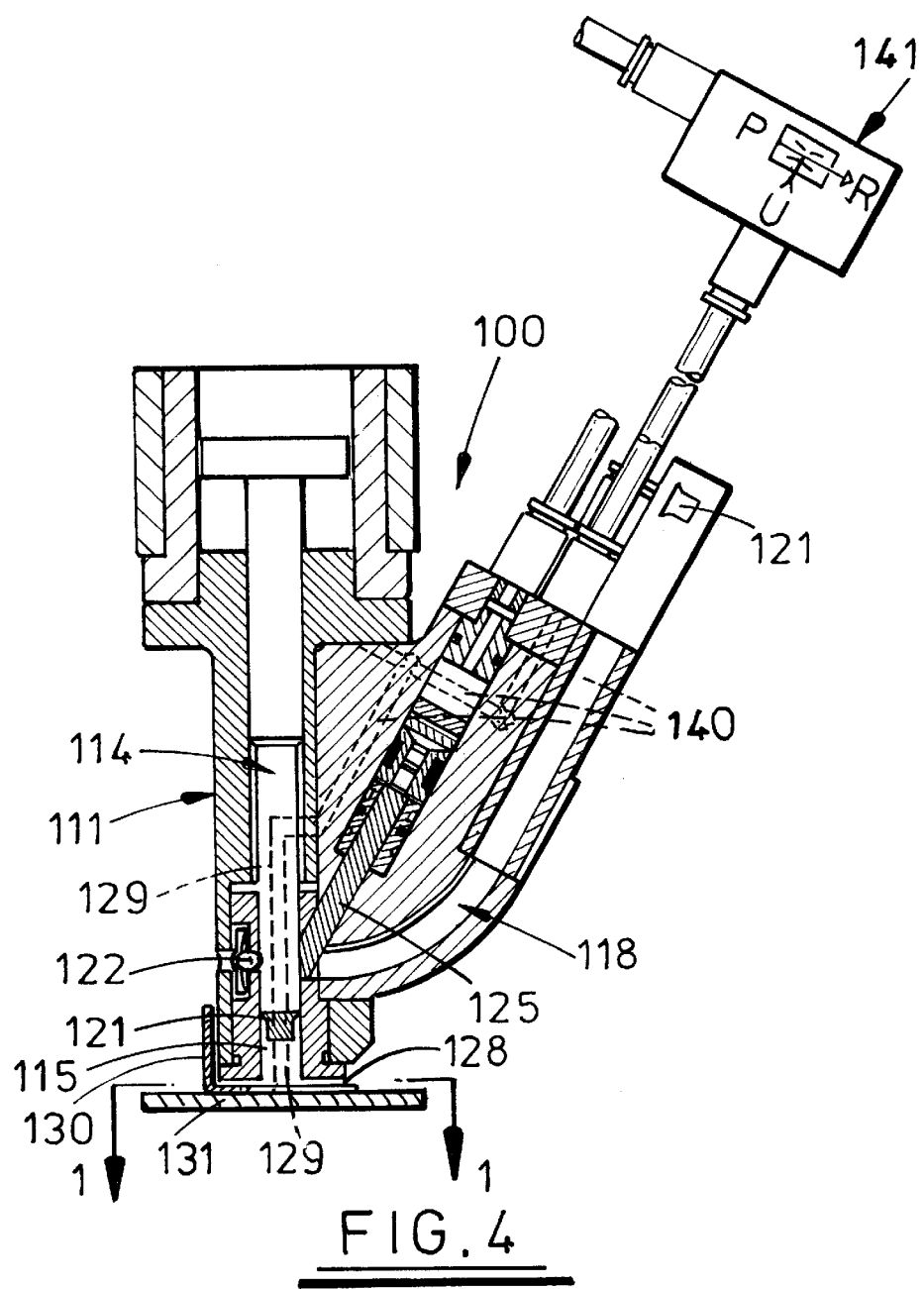
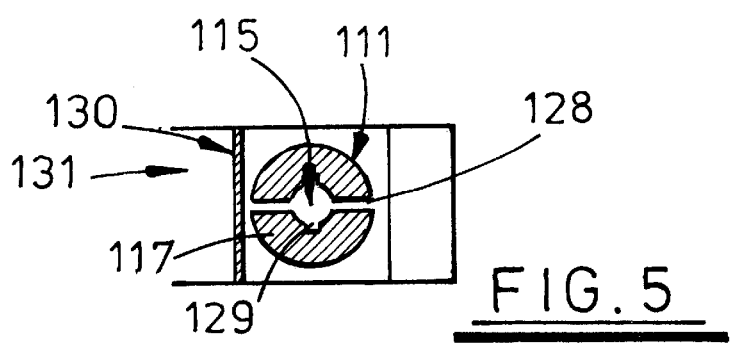

FEEDING HEADS FOR FASTENING MACHINES

BACKGROUND OF THE INVENTION

1. Field of the Invention

This Invention relates to automatic fastening machines or tools, and, in particular, to the fastener delivery head for such automatic fastening machines or tools.

2. Prior Art

Prior patent specifications, PCT/AU92/00621(WO 93/09918) and PCT/AU94/00013(WO 94/15736) by the present applicant both disclose automatic fastening machines or tools wherein the fastening head thereof operates with rivets and other types of fasteners, fed thereto in alignment with a punch or engagement tool therefor, and supporting the rivets or other fastener as the punch or engagement tool advances the rivet or other fastener towards a workpiece (and typically an upsetting die in the case of rivets).

While the fastening machines or tools disclosed in the above documents have found commercial acceptance, customers continue to propose new applications for fasteners, fastening diverse ranges of workpieces together, and particularly where access for the fastening operation is restricted, and sometimes extremely limited. The need to provide fastener aligning, centralising, and anti-tumbling features in the fastening head or nose pieces, particularly leading up to, and at the exit point thereof for a fastener, by reduced dimension of the parts, introduces fragility if the old techniques for control are retained. Short rivets in particular need to be controlled and the prior art has proposed steel balls or jaws for this purpose. If these are to be used they must be provided up to, and very close to, the front face or nose of the fastening apparatus to prevent tumbling, for example. A staggered sequence of such balls, or like type devices, over the length of a delivery tube requires a fairly elaborate construction, which restricts the capacity to reduce the front end dimensions of the fastener feeding head.

OBJECT OF THE INVENTION

It is an object of the present invention to provide a fastening head which addresses the aforementioned disadvantage in front end dimension. Other objects and various advantages will hereinafter become apparent.

DISCLOSURE OF THE INVENTION

The invention achieves its object in provision of a fastener feeding head for a fastening machine or tool by which to apply fasteners to a workpiece, said fastening head including;
- a guide means with a fastener passage there through;
- a drive means mounted for advance and retraction in the fastener passage;
- a fastener engagement means disposed in the fastener passage at or on a leading end of the drive means; and
- a fastener feed means feeding fasteners to the fastener passage, operative to align fasteners in the fastener passage with the drive means;

characterised in that:
- a gas control means is operative to effect or establish a gas pressure in the fastener passage which is operative to maintain a fastener therein in contact with, or in proper alignment or orientation to, the drive means as the drive means is advanced in the fastener guide passage. In order to effect the desired outcome the cross sectional dimension of the fastener passage is ideally closely fitted to the radial dimension of the fastener, its head in the case of a rivet. Alternately the foregoing might be achieved by careful dimensioning of the fastener engagement means such that it adequately fits to the fastener passage such that a suitable degree of pressurisation is developed and maintained in the fastener passage. A similar level of seal is required between the front end of the fastener passage and the work pieces as is will be more clearly developed herein below.

Preferably a fastener feeding head has a fastener feed means which includes a delivery passage for fasteners, fitted with a compressed gas source, operative to propel fasteners there through to the fastener passage, there being a gate means associated with the guide means to selectively isolate the fastener passage from the delivery passage. The fastener feeding head is ideally associated with a gas flow means in or associated with the guide means selectively directs gas from the delivery passage to the front or nose end of the fastener passage, forwardly spaced from the drive means, to cause compressed gas to maintain fasteners in contact with the drive means as the drive means is advanced in the fastener passage. Preferably a fastener feeding head in accordance with the invention is one wherein the gas flow means includes a piston driven gate means to switch gas in the delivery passage to flow passages leading to the front or nose end of the fastener passage.

Preferably a fastener feeding head in accordance with the invention is one wherein one or more balls or the like are retractably mounted in the guide means to retractably extend into the fastener passage, on the opposite side thereof to the junction between the delivery passage and the fastener passage, to assist alignment or centralising of the fasteners with the punch. Ideally a fastener feeding head is one wherein fasteners are supplied to the delivery passage by a supply tube which may have an internal profile complementary to the shape of the fasteners, the fasteners being propelled by compressed air blown down the supply tube. Ideally there is provided a gate means which is pneumatically controlled and the flow passages include one or more ports directed into the fastener passage adjacent the nose end, the gas directed thereto being sufficient to maintain contact of a fastener with the fastener engagement means when the nose of the guide bush or feeder block engages with a workpiece.

Preferably a fastener feeding head in accordance with the invention is one wherein when the nose end of the guide means is in contact with a workpiece, a vacuum means selectively at least partially evacuates the fastener passage to maintain the fasteners in contact with the punch as the punch is advanced in the fastener guide passage. Ideally there is a compressed gas source to propel a fastener through the delivery passage to the fastener passage, a gate means to selectively isolate the fastener delivery passage from the fastener guide passage after delivery thereto of a fastener, and, when the nose end of the fastener passage is in contact with a workpiece, and a vacuum means to selectively, at least partially, evacuate the fastener passage to maintain the fastener in contact with the fastener engagement means as it is advanced in the fastener guide passage. Ideally there is at least one slot or groove provided in the nose end of the guide means to allow air to be drawn into the fastener passage when the nose end is in contact with a workpiece or at least one slot or groove is provided in the wall of the fastener passage, connected to at least one port, in turn connected to a vacuum source, wherein the vacuum source is operative to draw air into the fastener guide passage through one or more grooves or ports in the nose end of the guide means, air creating the means by which a fastener is maintained in contact with the fastener engagement means as it drives the fastener through the fastener passage into engagement with a workpiece.

Preferably the invention provides a fastener feeding head wherein the guide means is a guide bush, the drive means is a plunger mounted for coaxial advance and retraction through the guide bush, the fastener engagement means is a punch located at or on a leading end of the plunger, and a carrier tape means transports rivets to the fastener passage, and a gas passage or port means in the guide means operable to connect a supply of compressed gas to the nose end of the fastener passage to cause the compressed gas to be directed into the fastener guide passage, spaced from the punch, the compressed gas being operative, in use, to maintain the rivets in contact with the punch as the punch is advanced in the fastener passage. Ideally the gas control means includes means in the guide means operable to connect a supply of compressed gas to the nose end of the fastener passage the compressed gas being switchable to maintain the fasteners in contact with the fastener engagement means as needed. The compressed gas means and vacuum means may be selectively controlled by switchable or computer controlled valves.

Throughout the specification, the term "fastener" shall include rivets, screws, and like type fastening devices, nuts, washers and similar type products with a ratio of radius to axial length calls for the handling capacity of the invention herein set forth. The preferred embodiments are in respect of rivets but the extension to other fasteners only requires a variation of the fastener engagement means used in the apparatus. Thus the punch of the preferred embodiments may be readily replaced by a driver for screws, in the case of screw fasteners as will be readily apparent to the man skilled in the art.

BRIEF DESCRIPTION OF THE DRAWINGS

To enable the invention to be fully understood, preferred embodiments will now be described with reference to the accompanying drawings in which:

FIG. 4 is a sectional side view of a second embodiment of the invention in accordance with the invention;

FIG. 5 is a sectional plan view taken on line 1—1 of FIG. 4; and

PREFERRED EMBODIMENTS

Figure 1:
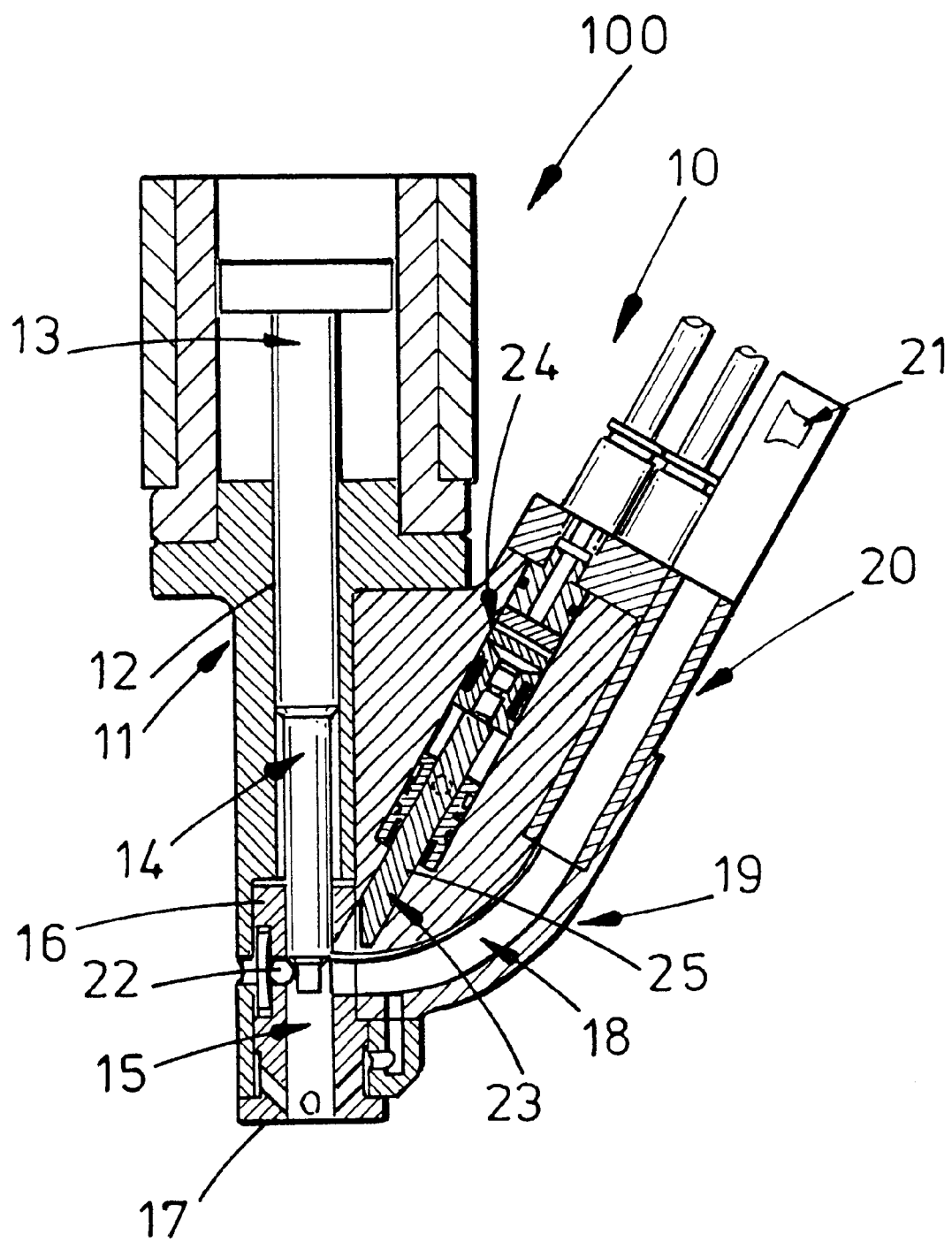
FIGS. 1, 2 and 3 are sectional side views of a first embodiment of a fastener feeder head in accordance with the invention showing the apparatus at different steps in its operation.
Figure 2:
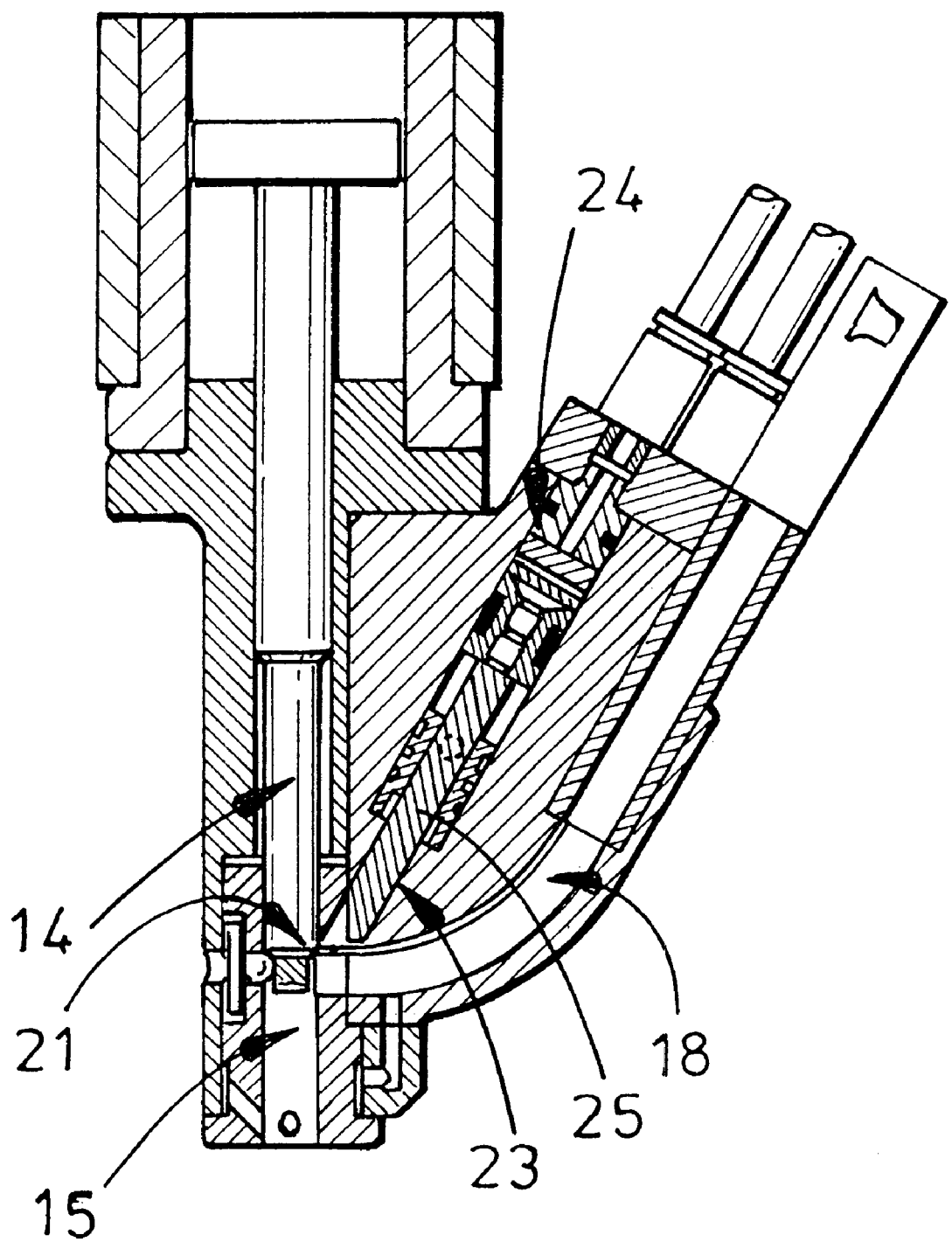
Figure 3:
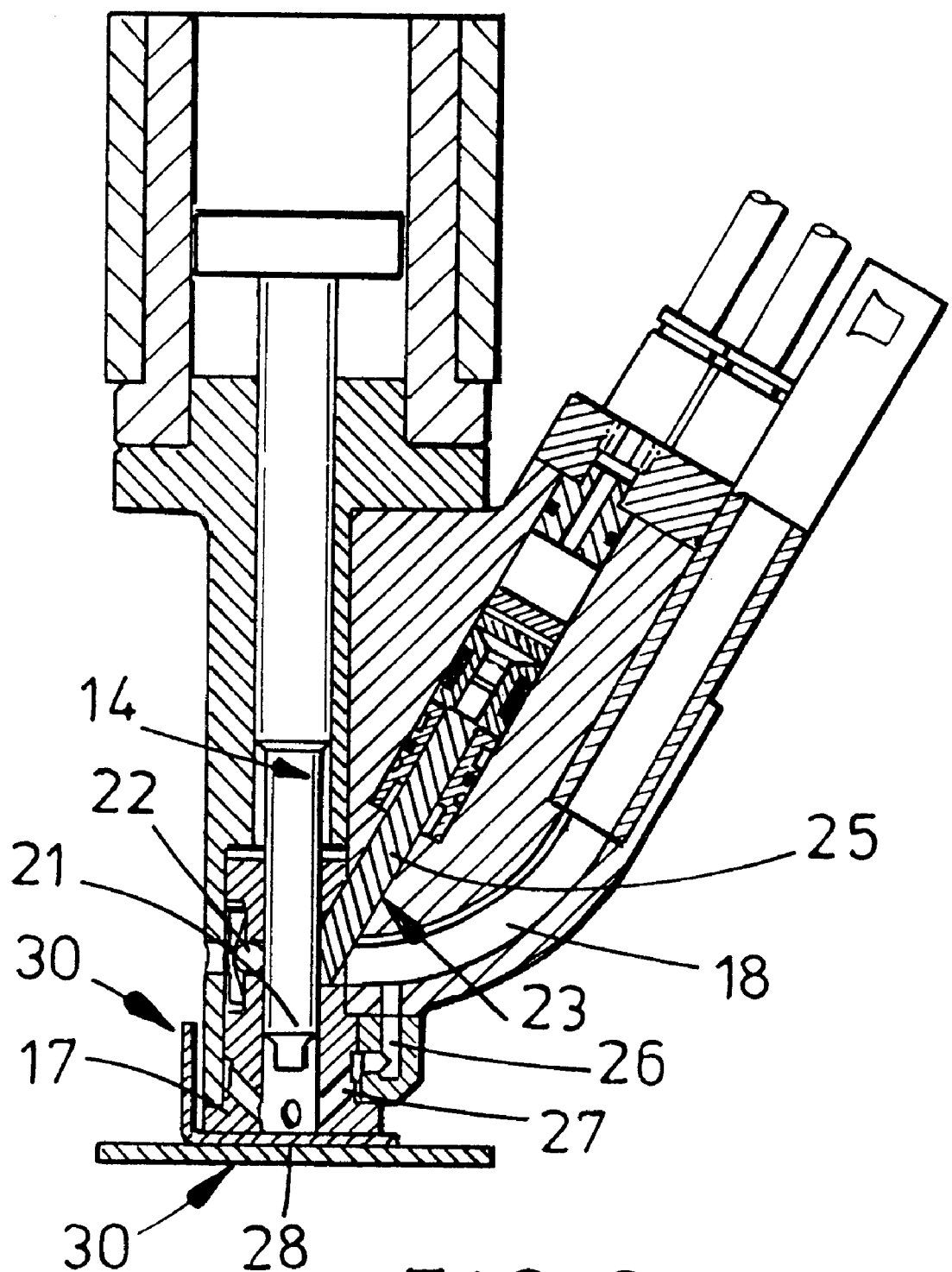

Referring to FIGS. 1 to 3, a fastener feeding head 10 for a fastening machine 100 may have a guide means which, in this embodiment, includes bush 11 with a fastener passage or bore 12 (hereinafter referred to as a bore for convenience) in which may be coaxially mounted a drive means such as plunger 13 (which will vary in character depending on what style of fastener is used, which, in turn, decides what action is to be performed by the drive means, hereinafter referred to as a plunger for convenience) which can be associated, as shown, with a fastener engagement means such as punch 14 (which will vary depending on what style of fastener it is to engage with but is conveniently referred to as a punch hereinafter) located or fitted at its forward end. The plunger is mounted for reciprocal advance and retractive movement in the bush 11. A fastener passage 15 is provided in the bush leading to a front end or nose portion 16 of the guide bush 11 and up to the front face or nose 17. The fastener passage 15 is preferably axially aligned with the punch 14 and it is open to the front face 17 to deliver fasteners thereto out of the fastener passage of the guide bush. A delivery passage 18 for feeding fasteners to the fastener passage can be provided in a side extension (or feeder block) 19 fitted to or mounted on the guide bush 11. It is operably connected to the fastener passage 15 with the junction of the two passages being below the forward end of the punch 14 when the punch is fully retracted. A supply tube 20 may be connected to a source of fasteners such as rivets (not shown) and the fastener being a rivet 21 in this case may be propelled through the supply tube 20 and the delivery passage 18 ideally by means of a compressed gas, such as compressed air.

When the rivets 21 enter the fastener passage 15, they may be aligned and centred with the forward end of the punch 14 by a suitable means or mechanism, including any of the mechanisms for this purpose seen in the prior art, such as via a plurality of spring mounted balls 22. A gate 23 may be provided, preferably with a pneumatic cylinder 24 which is ideally operable to advance or retract a blade 25 whose end may form the gate 23 so as to selectively isolate the delivery passage 18 from the fastener passage 15. This may also serve to divert compressed air from the delivery passage 18 to the nose end 16 and the front end of the fastener passage 15. This may be effected by means of flow via air passages 26, 27 and respective ports such as port 28. When the front face 17 of the guide bush 11 engages workpieces such as work pieces 30, 31, which in this embodiment are to be rivetted together, the front face 17 of the guide bush effectively seals the fastener passage to create therein a pneumatic cylinder where the rivet 21 acts as a free floating piston which is forced against the nose of the punch 14. Any air leakage is to be at a rate which is smaller than the rate at which the compressed air is supplied to the fastener passage 15. The punch 14 is then able to advance the rivet 21 past the balls 22, which centre the rivet to the punch axis. The force of the compressed air maintains the rivet in contact with the punch as it is advanced through the fastener passage 15 and up to the workpieces to then pierce the workpieces 30, 31, and be upset by an upsetting die (not shown) so as to complete the process. On retraction of the punch 14, the compressed air supply may be switched off, the blade 25 may be retracted, with the apparatus being then ready for the next cycle. In an alternative embodiment (not shown), the guide bush 11 can be substituted by a feeder block mounted on the plunger of the fastening machine 100.

Referring to the embodiment of FIGS. 4 and 5, the guide bush 111 is substantially as hereinbefore described except that radial grooves 128 are provided at the front face 117 of the guide bush 111 and diametrically opposed slots 129 may extend up the wall of the fastener passage 115 to be interconnected to vacuum passages 140 which may be connected to a means of establishing a vacuum 141. In operation, fasteners such as the rivets 121 may be delivered to the fastener passage 115, ideally propelled, thereto by compressed air, through the delivery passage 118, to be associated with, located against or engaged to the forward end of the punch 114 generally as hereinbefore described with reference to the first embodiment. The blade 125 may be advanced, as shown in FIG. 4, to isolate the fastener passage 115 from the delivery passage 118, and at this point the supply of compressed air may be shut off. The vacuum supply 141 is then operative to draw air into the fastener passage 115, past the rivet 121 and punch 114 (through slots 129). By this means there is created the pressure differential which is needed to develop the pressure which maintains the fastener in contact with the nose of the punch. When the front face 117 of the guide bush 111 engages the workpieces 130, 131, air can flow through the radial grooves 128 in the front face 117. The foregoing construction ensures that the desired association or contact is maintained between the rivet 121 and the punch 114 during operation of the fastener head.

When the punch 114 has advanced the rivet to and through the workpieces 130, 131 (and the rivet has been upset by the upsetting die, now shown), the vacuum source 141 may be rendered inoperative or switched off, the blade 125 is retracted, the punch 114 is also retracted, and the apparatus is ready to enable the next cycle to commence.

Figure 6:
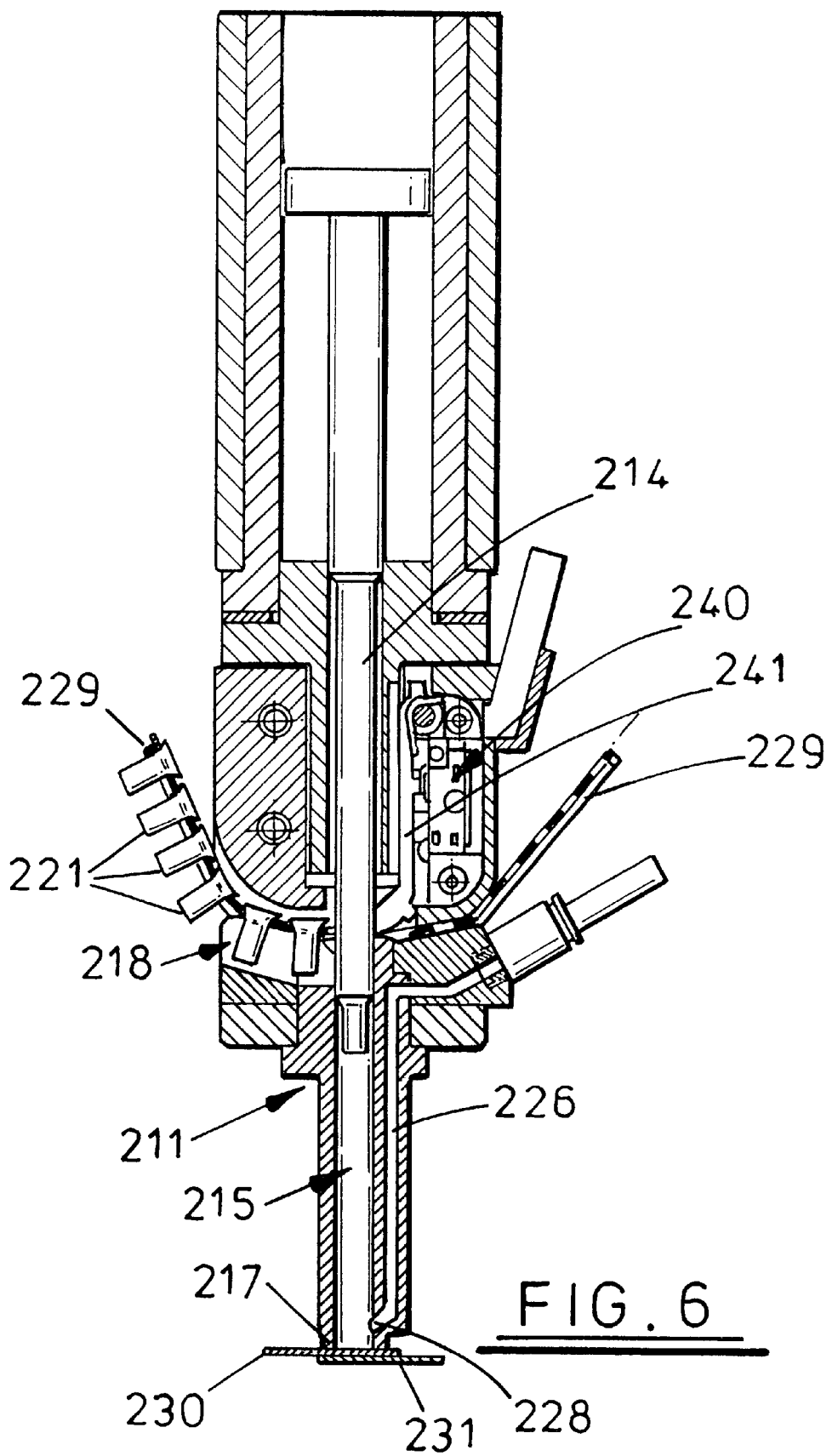
FIG. 6 is a side view of a third embodiment of the invention.

Referring now to FIG. 6, the guide bush 211 has a delivery passage 218 through which fasteners such as the rivets 221 may be transported via a carrier tape 229 into alignment with the punch 214 and fastener passage 215. The advance of the carrier tape 229 can be controlled by a suitable means such as finger 241 on a limit switch 240, in turn connected to a suitable drive (not shown) for the carrier tape 229. Air passage 226 may connect an air port 228 at the front face 217 of the guide bush 211 to a supply of compressed air (not shown). When the rivet 221 is aligned with the punch 214, and the front face 217 of the guide bush 211 contacts the upper workpiece 230, a charge of compressed air is allowed to be passed through the air passage 226 and port 228 to cause the rivet 221 to be maintained in contact with the nose end of the punch 214 as the latter is advanced in the fastener passage 215 towards the workpieces 230, 231. It will be noted that the centralising bells (122 of FIG. 4) may be omitted in this embodiment Concentricity tolerances may permit the rivets 221 to float within the fastener passage 215.

Both of compressed air, or the vacuum of the earlier embodiments, may be used in any of the embodiments so as to maintain the fastener or rivet 21, 121, 221 on the nose of the respective fastener engagement means or punch 14, 114, 214. The need for balls or other like devices (ie., similar to the balls 22, 122) along the fastener passage and adjacent the front face 17, 117, 217 of the guide bush 11, 111, 211 is obviated. The front end or nose of the guide bush can have greater structural strength (while having dimensions which enable rivets or other fasteners to be driven into, or carried to, the workpieces in confined spaces).

Various changes and modifications may be made to the embodiments described and illustrated without departing from the present invention.

What is claimed is:

1. A fastener feeding head for a fastening machine or tool by which to apply fasteners to a workpiece, said fastening head including:
   a guide means with a fastener passage therethrough;
   a drive means mounted for advance and retraction in the fastener passage;
   a fastener engagement means disposed in the fastener passage at or on a leading end of the drive means;
   a fastener feed means feeding fasteners to the fastener passage, operative to align fasteners in the fastener passage with the drive means, wherein the fastener feed means includes a delivery passage for fasteners, fitted with a compressed gas source, operative to propel fasteners there through to the fastener passage, there being a gate means associated with the guide means to selectively isolate the fastener passage from the delivery passage; and
   a gas control means operative to effect or establish a gas pressure in the fastener passage to maintain a fastener therein in contact with, or in proper alignment or orientation to the drive means, the gas pressure establishing a flow of gas in the fastener passage that maintains the fastener on the drive means while the drive means is advanced in the fastener passage.

2. A fastener feeding head as claimed in claim 1 wherein gas flow means in or associated with the guide means selectively directs gas from the delivery passage to the front or nose end of the fastener passage, forwardly spaced from the drive means, to cause compressed gas to maintain fasteners in contact with the drive means as the drive means is advanced in the fastener passage.

3. A fastener feeding head as claimed in claim 2 wherein the gas flow means includes a piston driven gate means to switch gas in the delivery passage to flow passages leading to the front or nose end of the fastener passage.

4. A fastener feeding head as claimed in claim 3 wherein the gate means is pneumatically controlled and the flow passages include one or more ports directed into the fastener passage adjacent the nose end, the gas directed thereto being sufficient to maintain contact of a fastener with the fastener engagement means when the nose of the guide bush or feeder block engages with a workpiece.

5. A fastener feeding head as claimed in claim 1 wherein one or more balls are retractably mounted in the guide means to retractably extend into the fastener passage, on the opposite side thereof to the junction between the delivery passage and the fastener passage, to assist alignment or centralising of the fasteners with the punch.

6. A fastener feeding head as claimed in claim 1 wherein fasteners are supplied to the delivery passage by a supply tube which may have an internal profile complementary to the shape of the fasteners, the fasteners being propelled by compressed air blown down the supply tube.

7. A fastener feeding head as claimed in claim 1 wherein when the nose end of the guide means is in contact with a workpiece, a vacuum means selectively at least partially evacuates the fastener passage to maintain the fasteners in contact with the punch as the punch is advanced in the fastener guide passage.

8. A fastener feeding head as claimed in claim 7 wherein there is a compressed gas source to propel a fastener through the delivery passage to the fastener passage, a gate means to selectively isolate the fastener delivery passage from the fastener guide passage after delivery thereto of a fastener, and, when the nose end of the fastener passage is in contact with a workpiece, and a vacuum means to selectively, at least partially, evacuate the fastener passage to maintain the fastener in contact with the fastener engagement means as it is advanced in the fastener guide passage.

9. A fastener feeding head as claimed in claim 8 wherein at least one slot or groove is provided in the nose end of the guide means to allow air to be drawn into the fastener passage when the nose end is in contact with a workpiece.

10. A fastener feeding head as claimed in claim 8 wherein at least one slot or groove is provided in the wall of the fastener passage, connected to at least one port, in turn connected to a vacuum source.

11. A fastener feeding head as claimed in claim 10 wherein the vacuum source is operative to draw air into the fastener guide passage through one or more grooves or ports in the nose end of the guide means, air creating the means by which a fastener is maintained in contact with the fastener engagement means as it drives the fastener through the fastener passage into engagement with a workpiece.

12. A fastener feeding head as claimed in claim 1 wherein the guide means is a guide bush, the drive means is a plunger mounted for coaxial advance and retraction through the guide bush, the fastener engagement means is a punch located at or on a leading end of the plunger, and a carrier tape means transports rivets to the fastener passage, and a gas passage or port means in the guide means operable to connect a supply of compressed gas to the nose end of the fastener passage to cause the compressed gas to be directed into the fastener guide passage, spaced from the punch, the compressed gas being operative, in use, to maintain the rivets in contact with the punch as the punch is advanced in the fastener passage.

13. A fastener feeding head as claimed in claim 1 wherein the gas control means includes means in the guide means operable to connect a supply of compressed gas to the nose end of the fastener passage the compressed gas being switchable to maintain the fasteners in contact with the fastener engagement means as needed.

14. A fastener feeding head as claimed in claim 13 wherein the compressed gas means and vacuum means are selectively controlled by switchable or computer controlled valves.

* * * * *